F. A. Lane.
Lubricator.
No. 86,421.          Patented Feb. 2, 1869.
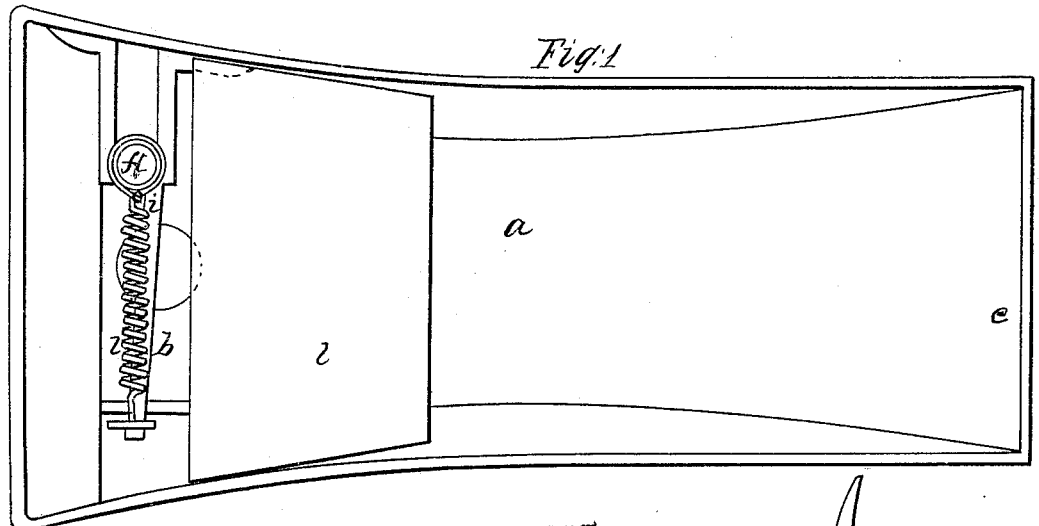
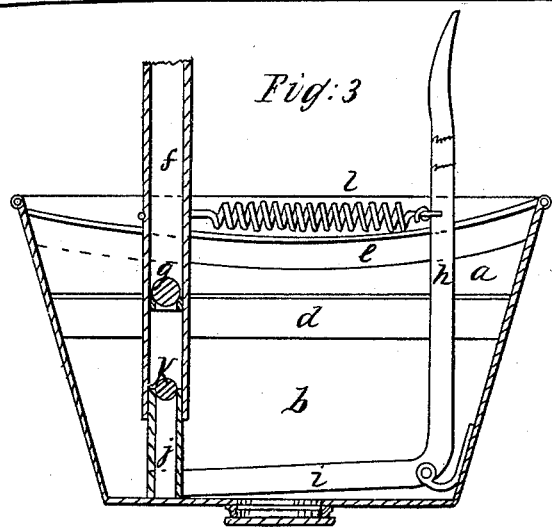
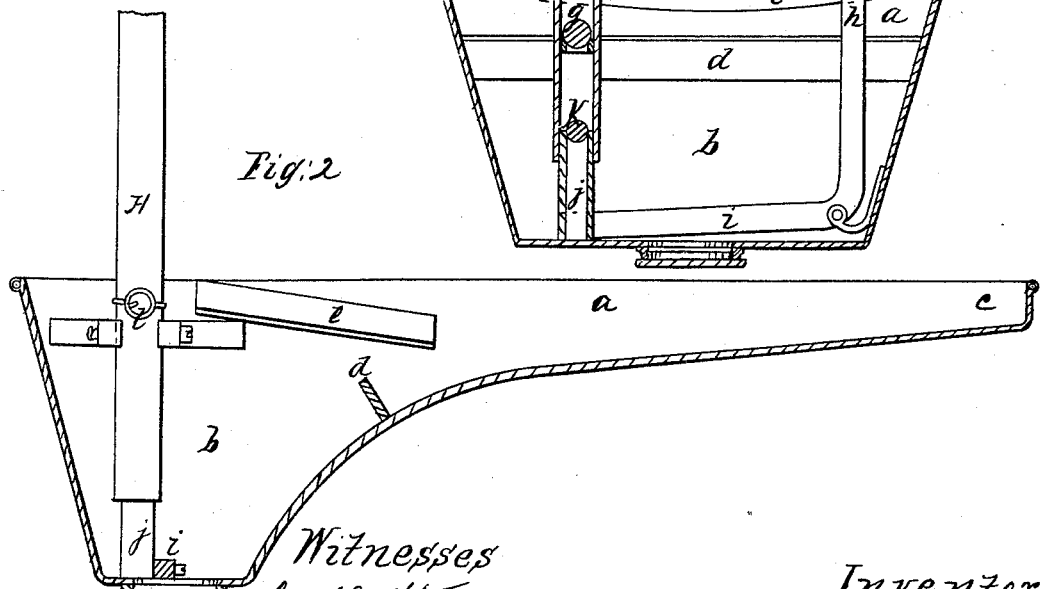
Witnesses
E. F. Wilder
Geo. C. Perrey
Inventor
Frederick A. Lane

United States Patent Office.

FREDERICK A. LANE, OF SWANZEY, NEW HAMPSHIRE, ASSIGNOR TO HIMSELF AND LUTHER S. LANE, OF SAME PLACE.

Letters Patent No. 86,421, dated February 2, 1869.

IMPROVEMENT IN LUBRICATORS.

The Schedule referred to in these Letters Patent and making part of the same.

*To all whom it may concern:*

Be it known that I, FREDERICK A. LANE, of Swanzey, in the county of Cheshire, and State of New Hampshire, have invented new and useful Improvements in Lubricators for Journal-Bearings; and I do hereby declare that the following is a full and exact description thereof, reference being had to the accompanying drawings, and to the letters of reference marked thereon.

The nature of my invention consists in providing a lubricating-device for journal-bearings, by so arranging and combining a brake-pump with oil-drips, whereby the same is operated by the shaft, and secured to its appendages thereto, the oil or lubricating-fluid filtered and cleansed, and the bearings kept properly and continually lubricated while in operation.

To enable others skilled in the art to make and use my invention, I will proceed to describe its construction and operation.

Figure 1 represents a plan of my improved lubricator.
Figure 2 represents a longitudinal section of the same.
Figure 3 represents a vertical section of the same.

Similar letters in the different figures indicate corresponding parts.

*a* represents the oil-drip, one end being provided with an oil-receptacle, *b*, the other end, *c*, being shallow, its length extending as desired, and inclining toward the receptacle *b*, between which is the filter *d*, which connects with the sides and bottom of the same.

Located over this filter *d* is the conveyer *e*, which conveys the waste or excess of oil, dropping from the box on to the same, to the inclined part, *c*, of the drip *a*, where it is conveyed by this inclination to the filter *d*, which stops or prevents the dirt and sediment from passing into the receptacle *b* with the lubricating-fluid.

Located on and in one side of this receptacle *b*, is the pump *f*, which is supplied with a ball-valve, *g*, which is located the desired distance from the bottom of the same, this pump *f* being firmly secured to the drip *a*, near its top.

*h* is the brake, which is pivoted, at the bottom of the receptacle *b*, to the drip *a*, it being located on the opposite side of the same from the pump *f*, this brake *h* being provided with an arm, *i*, which extends crosswise of the drip *a*, and connects with the piston *j* by a hinge-pivot, which piston *j*, at its top, is furnished with a ball-valve, *k*, and seat, and operates in the inside of the pump *f*, near its bottom.

*l* is a spiral spring, which connects the pump *f* and brake *h*, being located on and secured to the same, near the top of the drip *a*, the object of this spring being, after the cam leaves the brake *h*, to throw, as it contracts, the piston *j* back into its former position.

The drip *a* is connected and secured to and located in under the bearing, the top of the pump *f* being connected by a suitable pipe with the oil-holes over the bearing, and operated by a cam-projection secured to the shaft, which, as the same revolves, comes in contact with the top of the brake *h*.

At the bottom of the receptacle *b* is a device, which enables the operator to cleanse the same, if required.

The lubricator being thus constructed, and its several parts arranged as described, and firmly secured to the hanger or bearing, the receptacle *b* furnished with lubricating fluid, and the pump *f* connected to and with the bearing and shaft, provided with a cam-projection, placed opposite the brake *h*, is then ready for use, motion being given to the shaft operating the cam, which coming directly against the brake *h*, raises or operates the piston *j*, which, when the brake *h* is relieved from the cam, by the spring *l* contracting, throws the piston *j* back by this operation, with the assistance of the valves *g* and *k*, by their suction conveys the oil into the pump *f*, where it is forced through the pipe to the bearing to be lubricated, which, at every revolution the shaft makes, by aid of the cam and spring *l* contracting, the bearing is furnished with a fresh supply of oil. If more than the bearing uses, it runs from the same, taking with it all dirt and wearings of the box and journal, and caught by the drip *a* and conveyer *e*, where it is conveyed by the inclination of the same to the filterer *d*, where the sediment and dirt are kept from passing back into the receptacle *b*, with the lubricating-fluid, which leaves the oil in a proper condition to be used again.

Thus, with this device, by keeping the bearings in a continual state of lubrication, less power is required to drive the shaft, resulting in decreasing the wear of the same, as the bearing is kept entirely free from grit and gumming of any kind.

Also, by aid of the filter *e*, the oil or lubricating-fluid is cleansed from all impurities, allowing it to be used until completely used or worn up, always keeping, in the receptacle *b*, a fresh supply of oil, besides providing a cheap, durable, strong, and convenient device, and one long demanded by journal-bearings.

What I claim as my invention, and desire to secure by Letters Patent, is—

The pump *f*, in combination with the drip *a*, when constructed and arranged to operate substantially as and for the purposes described.

FREDERICK A. LANE.

Witnesses:
E. F. WILDIS,
GEO. E. PEVEY.